A. C. TAYLOR.
CONNECTION FOR ELECTRICAL TERMINALS.
APPLICATION FILED JUNE 26, 1913.
1,163,703.
Patented Dec. 14, 1915.
2 SHEETS—SHEET 2.
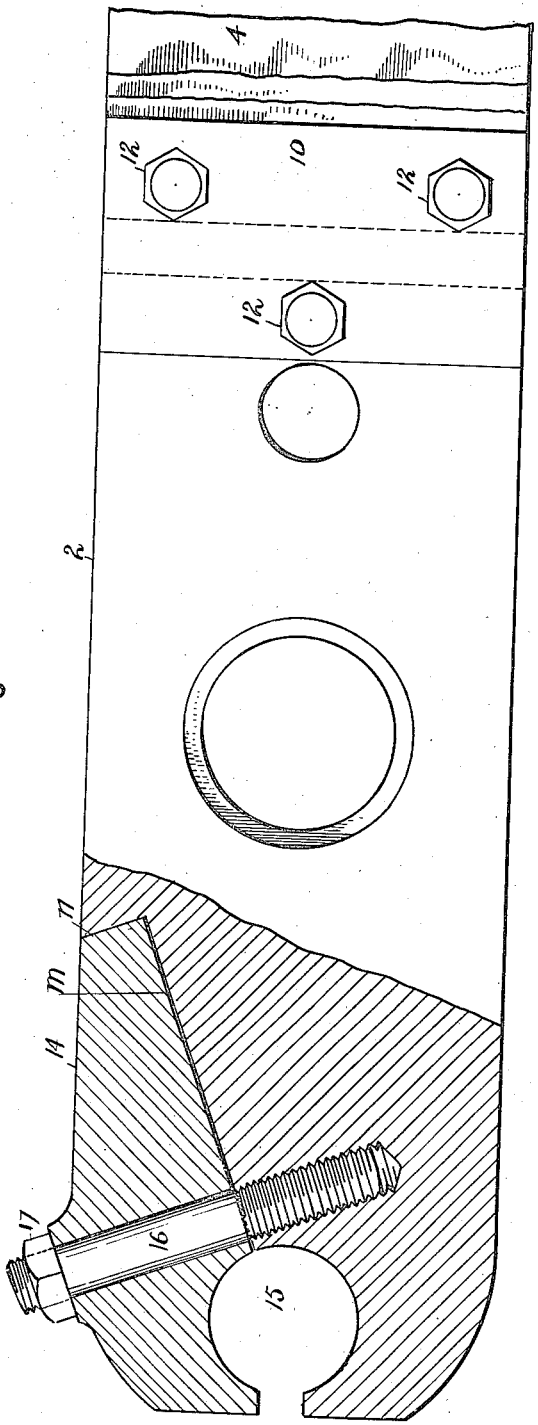
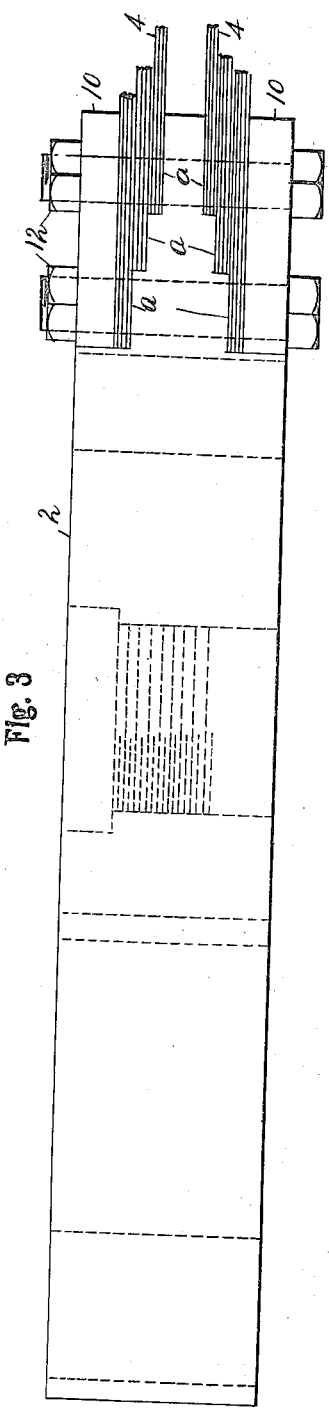

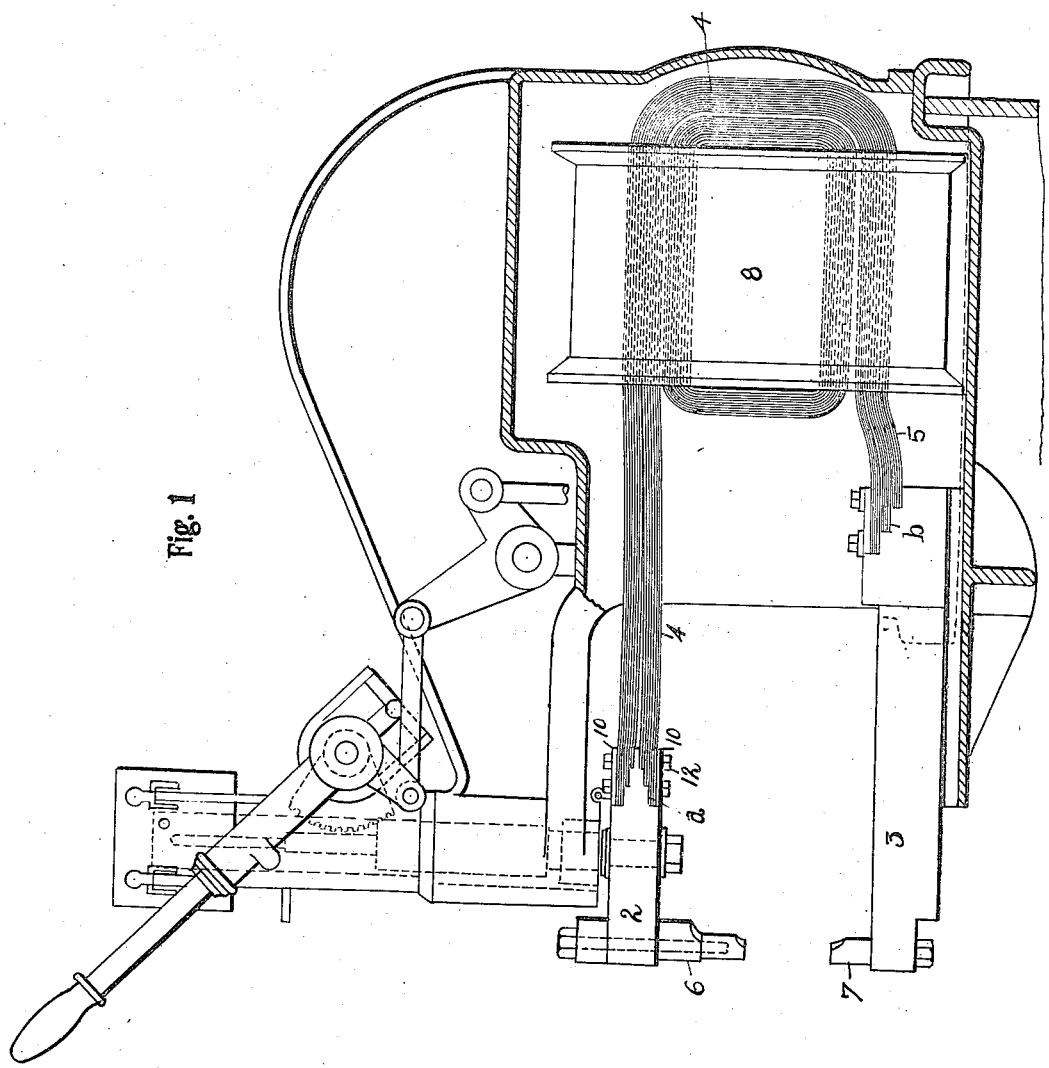

UNITED STATES PATENT OFFICE.

ALBERTIS C. TAYLOR, OF WARREN, OHIO, ASSIGNOR TO THE WINFIELD MANUFACTURING COMPANY, OF WARREN, OHIO, A CORPORATION.

CONNECTION FOR ELECTRICAL TERMINALS.

1,163,703.　　　　　Specification of Letters Patent.　　Patented Dec. 14, 1915.

Application filed June 26, 1913. Serial No. 775,891.

*To all whom it may concern:*

Be it known that I, ALBERTIS C. TAYLOR, citizen of the United States, residing at Warren, in the county of Trumbull and State of Ohio, have invented certain new and useful Improvements in Connections for Electric Terminals, of which the following is a specification.

This invention has reference to a connection for electric terminals, and the invention is specially applicable to electric welding machines and is adapted to overcome existing objections and to provide material advantages as hereinafter shown and described.

In the accompanying drawings, Figure 1 is an elevation of a simple form of machine in which this invention is employed. Fig. 2 is a plan view, considerably enlarged, of the upper welding member or terminal and a portion of the secondary electric-current-conducting band thereon, and Fig. 3 is an edge view of Fig. 2.

The novelty herein resides more particularly in that portion of the machine which comprises the solid copper terminals or holders 2 and 3, the secondary bands or conductors 4 and 5 of the transformer and the welding electrodes 6 and 7. These elements are operatively associated in and form a part of a machine having a transformer 8 and which is particularly described and claimed in a concurrent application bearing Ser. No. 775,890, the said machine being also outlined in Fig. 1 of this application. The invention is also applicable to butt-welding machines.

Specifically, the invention herein consists in the original and novel construction of the said terminals or holders 2 and 3 and in the bands 3 and 4, in that both holders have stepped ends for making engagement of the said secondary bands therewith. Heretofore devices of this general character in this class of machines have been made by superimposed or laminated bands of flat sheet copper of the same length in each band and laid flat one upon the other their entire length and upon the ends of terminals corresponding to 2 and 3, but in all such constructions the serious objection has arisen that the lower or inner strip of the band has had to bear the burden of the current and was liable to become over-charged and heated because it alone was in direct or immediate contact with the terminal member while the other strips or layers above came into the circuit with indirect contacts and as mere layers one upon the other secured by bolts through all the layers into the terminals and each introducing a measure of resistance proportioned to its distance from the bottom strip. The invariable experience with such connections, however perfectly made, has been materially depreciated current-carrying value for the secondary bands and with the result that the desired volume of current was only obtained by excessive pressure which had to be borne practically entirely by one thin strip of the band and the consequent heating and resistance in the band as described.

The present invention is directed to the overcoming or remedying of this vital objection, and, as above indicated, lies in the terminals or holders 2 and 3 which have their ends provided with a series of graduated steps *a* and *b* respectively. The holder 2 has three steps on each side, bottom and top, and the holder 3 has three steps on top, but there might be more and on both sides also.

The advantage of stepping the holder and using copper strips or plates of different end lengths according to the said steps is obvious in view of the former difficulty above described when all the strips in the band were laid one upon the other at the ends, because each step affords an additional direct contact surface for one of the several strips of the bands and there are at least three such contacts instead of only one as formerly, and six in holder or terminal 2 counting both sides. When this manner of building up and connecting said bands is practised the number of direct contacts is not only increased but all the other strips which overlie the primary strip in each step are materially enhanced in efficiency and thus the entire band is brought up to a substantially uniform current-carrying value and there is no such loss or depreciation of current and over-heating of the bands as formerly when this manner of making connections was unknown.

The bands 4 and 5 are divided at their ends into groups of two or more of the constitutent strips according to the depth of the said steps or recesses, and the said strips vary in length according to the particular step they are to occupy, the inner strips being shortest and overlapped by the next outer strips to the depth of the next succeeding step and so on. Plates 10 and bolts 12 which pass through said ends and the said strips and holders bind the parts firmly together. The length of the riser of the inner or last step is far greater than the others as it is designed to have plate 10 abut against it and to come flush with the top surface of the holder. Obviously, the said bands are flexible and are referred to herein in the plural but rather to distinguish the different ends of what in fact constitute a single or unitary band in conducting relations with the transformer.

Finally, it will be seen in Fig. 2 that a special clamping jaw 14 is provided for the upper welding electrode 6. To this end the holder or terminal 2, which is a solid piece of copper, has a recess formed in its side and end with an inclined bottom $m$ running down to the center of the hole 15 for said electrode and a shoulder $n$ at the top of said incline, and the clamp or jaw 14 abuts against the said shoulder and rests on or nearly on the surface $m$ when fastened upon said electrode. A portion of the recess for the electrode is provided in the jaw 14 and the other portion in the holder 2, and a single screw 16 and nut 17 fasten the jaw in place. The holder 2 being of copper the most practical way of providing a fastening therein for said jaw is to permanently screw the bolt 16 into the holder and secure the jaw by the nut 17 on the outer end of said bolt. The jaw itself is sleeved on said bolt and may be removed by first removing nut 17 and leaving the bolt in its fixed position.

What I claim is:

1. In an electric machine, a terminal member having a graduated stepped end and a conducting connection therefor comprising superimposed flat conducting strips of graduated length affixed in overlapping relations upon each other and said stepped end, and means to bind said parts together.

2. In an electric machine, a terminal member having a plurality of steps on opposite sides at one end thereof and a connection comprising a series of flat conducting strips laid on each of said steps successively, and means to secure said strips upon said member.

3. In electric machines, a terminal connection having a clamping device at one end and a stepped surface on each side at its other end, in combination with a series of flat conductors mounted upon each stepped surface, and plates and means to affix the ends of said conductors in overlapping relations upon the stepped end of said holder.

In testimony whereof I affix my signature in presence of two witnesses.

ALBERTIS C. TAYLOR.

Witnesses:
JESSIE G. GATES,
W. D. BYARD.